United States Patent [19]

McCormack

[11] 4,397,548
[45] Aug. 9, 1983

[54] DISTANCE MEASURING SYSTEM

[75] Inventor: Ray G. McCormack, St. Joseph, Ill.

[73] Assignee: The United States of America as represented by the Secretary of the Army, Washington, D.C.

[21] Appl. No.: 217,335

[22] Filed: Dec. 17, 1980

[51] Int. Cl.³ .............................................. G01C 3/08
[52] U.S. Cl. ............................................. 356/5; 356/4
[58] Field of Search ............................................. 356/5

[56] References Cited

U.S. PATENT DOCUMENTS

| 3,019,690 | 2/1962 | Hildebrand et al. | 356/5 |
| 3,022,702 | 2/1962 | Pocher | 356/5 |
| 3,511,568 | 5/1970 | Hossmann | 356/5 |
| 4,181,431 | 1/1980 | Chaborski | 356/5 |

*Primary Examiner*—S. C. Buczinski
*Attorney, Agent, or Firm*—Darrell E. Hollis

[57] ABSTRACT

A modulated light beam from a radiation source on a structure whose position is to be measured is split into a first beam which propagates through the atmosphere to a first detector and a second beam which travels through an optical fiber to a second detector. The first and second detectors recover the modulation on the first and second beams, the phases of which are compared to determine the distance. In a preferred embodiment, the light source is a sine-wave modulated laser.

3 Claims, 2 Drawing Figures

DISTANCE MEASURING SYSTEM

GOVERNMENT INTEREST

The invention described herein may be manufactured, used and licensed by or for the Government for governmental purposes without the payment to me of any royalties thereon.

BACKGROUND OF THE INVENTION

The present invention relates to distance measuring devices and, more particularly, to distance measuring devices employing a modulated light source.

Light sources such as, for example, incandescent sources as disclosed in U.S. Pat. No. 3,778,157 and laser sources as disclosed in U.S. Pat. No. 3,792,928, have been used in distance measuring apparatus wherein the light is transmitted through optical fibers ending a distance away from a reflecting surface. Other optical fibers alongside the transmitting optical fibers receive the reflected radiation for transmission to a detector.

In U.S. Pat. No. 4,064,754, two optical paths are established through separate optical fibers in a device for measuring the depth of fluid in a tank. One of the fibers terminates in a reflective surface at a reference point in the tank. The other optical fiber transmits light into a measurement path which is variable in dependence upon the depth of fluid in the tank, and the light is reflectively returned from the variable length optical path into the second optical fiber. The two optical fibers are separately pulsed with pulses of light and the light which is returned along the optical fibers is employed to measure the fluid depth. The length measured to the reference point is subtracted from the length measured along the variable path length to yield a measure of the variable portion of the path line alone.

OBJECTS AND SUMMARY OF THE INVENTION

It is an object of the present invention to provide a distance measuring apparatus.

More specifically, it is an object of the present invention to provide a distance measuring apparatus in which a modulated light source situated on a structure whose position is to be measured provides an output beam which is split into a directly-propagated beam and a beam which is carried by an optical fiber. Both the direct and the optical fiber beams are detected in a fixed receiver to recover the modulation thereon. The difference in phase of the modulation received along the two paths is employed as a measure of the distance.

According to an aspect of the invention, there is provided an apparatus for measuring a variable distance between a first point and a second point comprising means at the first point for providing a modulated beam of light, means for splitting the modulated beam of light into first and second modulated beams of light, means for directly transmitting the first modulated beam of light the distance to the second point, an optical fiber having a substantially fixed optical path length, the optical fiber being effective to transmit the second modulated beam over the substantially fixed optical path length from the means for splitting to the second point, means at the second point for separately recovering modulation from the first and second modulated beams to produce first and second modulation signals respectively, and means for comparing a phase of the first and second modulation signals to determine the variable distance.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENTS

Figure 1:
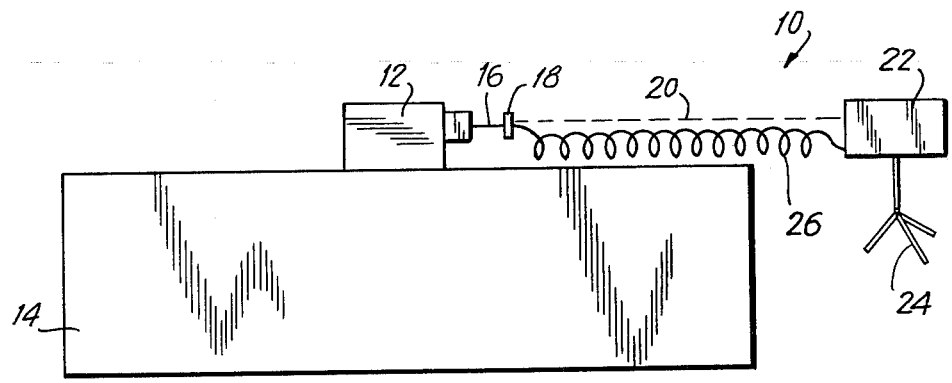
FIG. 1 is a side view of a distance measuring apparatus according to an embodiment of the present invention.

Referring to FIG. 1, there is shown, generally at 10, a distance measuring equipment according to an embodiment of the present invention. An optical source 12 is fixed on a object 14 whose position is to be measured. Optical source 12 may be of any suitable type capable of being modulated. For example, optical source 12 may be an incandescent source which is modulated by conventional means but, in the preferred embodiment, optical source 12 is preferably a light emitting diode and most preferably a laser. The modulation on optical source 12 may be of any type such as, for example, a square-wave but is preferably a sine-wave. Any suitable modulation frequency may be employed. For a laser source, modulation at 1 gHz or higher is desirable in order to provide as short a modulation wave length as possible.

Optical source 12 produces a beam of light 16 which is projected to a beam splitter 18. Beam splitter 18 permits a portion of beam 16 to pass therethrough as shown by a dashed line 20 which impinges upon a detector 28 (see FIG. 2) in a receiver 22. Receiver 22 is mounted on the ground or on a second object by any convenient means such as, for example, by legs 24.

Beam splitter 18 directs a portion of its input into a first end of an optical fiber 26 whose second end terminates in a detector 34 (FIG. 2) in receiver 22.

Optical fiber 26 may be looped or draped to permit extension and reduction of the distance between optical source 12 and receiver 22 without being stressed. Under these conditions, except for minor changes in length of optical fiber 26 due to temperature changes, the optical path length from beam splitter 18 along optical fiber 26 to receiver 22 remains constant whereas the optical path length along direct path 20 is variable. Thus, a comparison of the phase difference in the modulation between the directly transmitted and optical fiber transmitted components provides a measure of the length of direct path 20.

Since the modulation wave length is about one foot, a range ambiguity occurs at one foot intervals. That is, receiver 22 is incapable of discerning the difference between two points that are exactly 0.3 meters apart. Such range ambiguity may be resolved by any convenient means. For example, a coarse measurement of direct path 20 may be made with a tape or chain or other mechanical measurement device to roughly calibrate receiver 22 and then the final measurement of distance may be accomplished by phase comparison in receiver 22. Alternatively, a different lower modulation frequency may be employed having a wave length on the order of, or longer than, the normal modulation frequency to provide an initial coarse calibration. After such coarse calibration, the normal higher modulating frequency may be applied for fine resolution.

Figure 2:
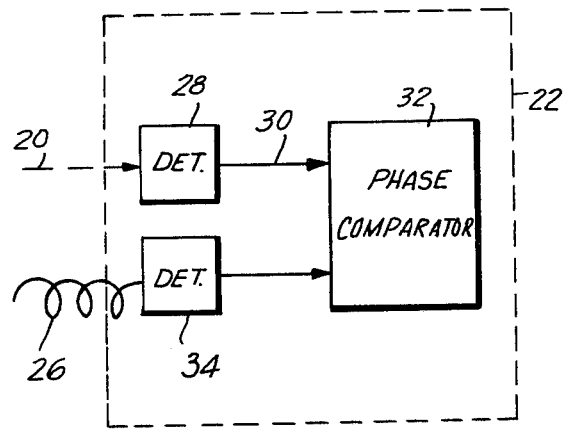
FIG. 2 is a simplified block diagram of the receiver of FIG. 1.

Referring now to FIG. 2, detector 28 receives direct beam 20, recovers the modulation thereon and transmits the modulation on a line 30 to a phase comparator 32. Detector 34 similarly demodulates the signal transmitted thereto along optical fiber 26 and connects the recovered modulation along a line to a second input of phase comparator 32.

Phase comparator 32 may be of any convenient type such as, for example, a commercially available vector volt-meter such as a Hewlett-Packard Model 8405A. Such a commercial instrument is capable of measuring phase difference with a resolution of about 0.1 electrical degrees. The wave length of 1 gHz in air is exactly 0.3 meters or about one foot. Thus, the distance can be measured with a resolution of about 1/3600 feet. This resolution can be improved as the modulating frequency is increased. At the present time, a modulating frequency of about 1 gHz is achievable with appropriate equipment.

Having described specific embodiments of the invention with respect to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. Apparatus for measuring a variable distance between a first point and a second point comprising:
   means at said first point for providing a modulated beam of light;
   means for directly transmitting said first modulated beam of light said distance to said second point;
   an optical fiber having a substantially fixed optical path length;
   said optical fiber being effective to transmit said second modulated beam over said substantially fixed optical path length from said means for splitting to said second point;
   said optical fiber being disposed adjacent said first beam of light the full distance between said first and second points;
   means at said second point for separately recovering modulation from said first and second modulated beams to produce first and second modulation signals respectively; and
   means for comparing a phase of said first and second modulation signals to determine said variable distance.

2. Apparatus according to claim 1 wherein said means at said first point for providing a modulated beam of light includes a laser.

3. Apparatus according to claim 1 wherein said means at said second point for separately recovering modulation includes first and second detectors and said means for comparing includes a phase comparator.

* * * * *